United States Patent [19]

van der Werff

[11] Patent Number: 5,007,507
[45] Date of Patent: Apr. 16, 1991

[54] METHOD OF, AND A DEVICE FOR, CONTROLLING THE ROTATION OF AN ELEMENT ABOUT AN AXIS OF MEANS OF A WRAP SPRING

[75] Inventor: Jeichienus A. van der Werff, Montfoort, Netherlands

[73] Assignee: Hadewe B. V., Drachten, Netherlands

[21] Appl. No.: 362,501

[22] Filed: Jun. 7, 1989

[30] Foreign Application Priority Data

Jun. 7, 1988 [NL] Netherlands ............... 8801461

[51] Int. Cl.$^5$ ............... F16D 51/04; B65H 31/10; B65H 1/10
[52] U.S. Cl. ............... 188/77 W; 271/160; 271/217; 192/33 C
[58] Field of Search ............... 271/216, 217, 160; 188/77 W; 242/36, 37 A; 192/33 C

[56] References Cited

U.S. PATENT DOCUMENTS

| | | | |
|---|---|---|---|
| 2,387,711 | 10/1945 | Barr | 188/77 W |
| 2,960,334 | 11/1960 | Trombetta | 271/160 |
| 3,064,766 | 11/1962 | Hanizeski | 188/77 W |
| 3,565,356 | 2/1971 | Marbacher | 242/18 |
| 4,093,377 | 6/1978 | Tsuda | 355/76 |
| 4,191,283 | 3/1980 | Keeny, III. | 192/26 |
| 4,278,032 | 7/1981 | Kritske | 188/77 W X |
| 4,457,406 | 7/1984 | Porter | 188/77 W X |
| 4,600,240 | 7/1986 | Suman et al. | 188/77 W X |

FOREIGN PATENT DOCUMENTS

| | | |
|---|---|---|
| 2003096 | 11/1969 | France . |
| 59-128048 | 7/1984 | Japan . |
| 60-189735 | 9/1985 | Japan . |
| 2028456 | 3/1980 | United Kingdom . |

*Primary Examiner*—Michael S. Huppert
*Assistant Examiner*—Kenneth R. DeRosa
*Attorney, Agent, or Firm*—Burns, Doane, Swecker & Mathis

[57] ABSTRACT

A method of, and a device for, controlling the rotation of an element about an axis are disclosed. A continuous torque is exerted on the element to rotate it in one direction, and a control member engages with one end of a wrap spring, which extends around a cylindrical part of the element, to preclude rotation of the element when the control member is in a first position. When the control member is out of the first position, the wrap spring loosens about the cylindrical element, thereby allowing the element to rotate under the continuous torque. However, rotation of the element under the continuous torque indirectly causes the control member to return to the first position, thus precluding further rotation of the element.

13 Claims, 4 Drawing Sheets

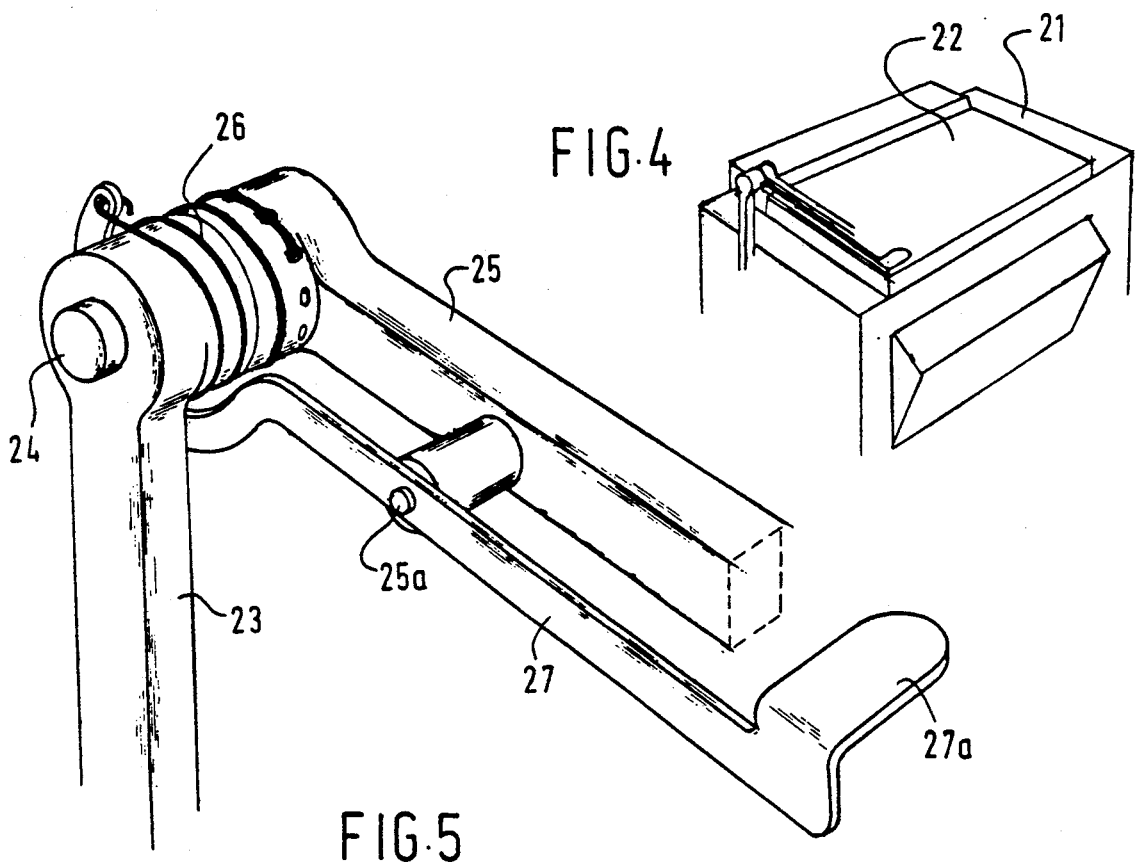
FIG.4
FIG.5
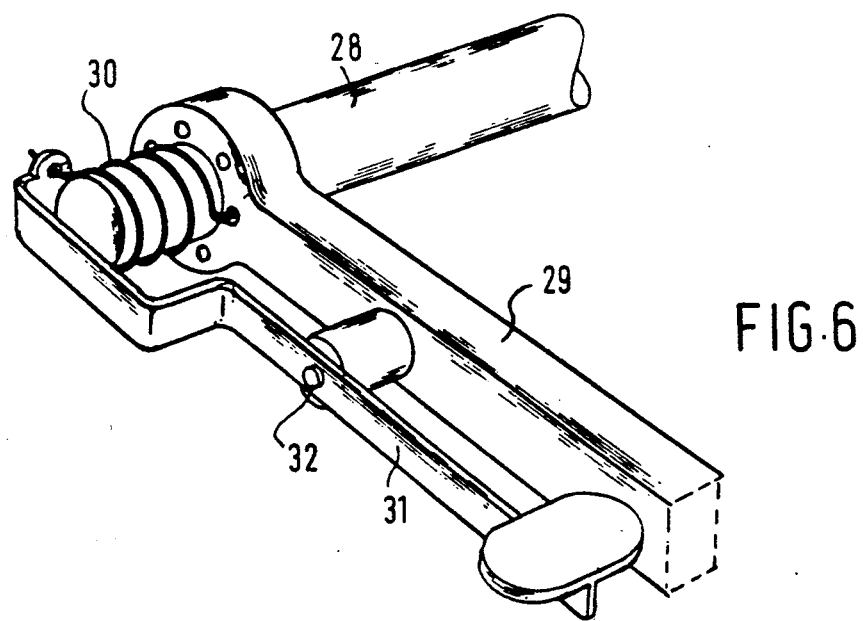
FIG.6

METHOD OF, AND A DEVICE FOR, CONTROLLING THE ROTATION OF AN ELEMENT ABOUT AN AXIS OF MEANS OF A WRAP SPRING

This invention relates to a method of, and device for, controlling the rotation of an element about an axis by means of a wrap spring which, upon engagement with a cylinder-shaped part, precludes rotation of the element in one direction and allows rotation in the other direction, while a continuous torque is exerted which, when controlled by the wrap spring, is adapted to rotate the element about the axis, said control taking place by bringing a control member engaging with one of the ends of the wrap spring out of its starting position.

It is known to use a wrap spring, i.e. a wound spring having a plurality of windings extending in or about a cylinder-shaped part, as a unidirectional freewheel clutch. The operation of the spring is then based on a normal force exerted between the spring and the cylinder-shaped part, which force can be influenced by twisting or untwisting the wrap spring. Twisting results in an intimate contact between spring and cylinder-shaped part, thereby causing the two elements to behave as a unit and untwisting effects an uncoupling.

Use can be made of these properties of the wrap spring to employ it as a unidirectional freewheel clutch, e.g. in an elevator, in order to prevent the conveyor from running in the reserve direction as a result of the weight of the transported goods when the drive torque on the elevator drops out. To that end, the wrap spring is so arranged that, during normal drive of the shaft of the elevator, the wrap spring is untwisted, thereby allowing rotation of the shaft. However, when the drive torque drops out, the opposite torque on the shaft produced by the weight of the goods on the elevator and may be acting continuously will prevail and tend to return the elevator by reversing the direction of rotation of the shaft. Such a reversal of the direction of rotation, however, results in a twisting of the wrap spring and hence the intimate contact of spring and shaft, thereby locking the shaft against rotation.

A known application of a wrap spring is that in a coupling, as disclosed in GB-A-2028456, wherein untwisting of the wrap spring takes place, and hence uncoupling, by direct or indirect engagement of one of the ends of the wrap spring during rotation against a stationary catch. Withdrawal of the catch restores the coupling. Said end can also be connected to a control member, which is controllable electro-magnetically, so that the coupling can be controlled by means of preprogrammed or non-preprogrammed control signals originating outside the system.

It is an object of the present invention to impart a new function to the wrap spring, i.e. that of a control member in an energized mechanical control system.

This is achieved according to the present invention in a method of the above described type which is characterized in that, through rotation of the element, by means of the continuous torque as a result of the control member being brought out of its starting position, said control member is returned to its starting position relative to the other end of the wrap spring. These features allow to control, through a feedback of the position of the control member relatively to the other end of the wrap spring, the energization of the system, or with a relatively small force, necessary for switching the wrap spring, a relatively great force can be controlled in a relatively simple manner through a purely mechanical and directly operative feedback.

Depending upon what has to be controlled or energized, different arrangements of the wrap spring are possible.

When an intermittent but directly operative rotation of a shaft is required, it may be ensured according to a further embodiment of the present invention that the continuous torque engages with the element and rotation of said element as a result of said torque is locked by the wrap spring, which locking can be removed by operation of the control member, so that the element starts to rotate under the influence of the torque, which rotation returns the control member to its starting position relative to the end of the wrap spring with which the control member does not engage. Rotation of the shaft will return the control member again to its starting position, whereby the wrap spring will again engage with the shaft and lock this against further rotation until the control member is displaced again.

When the continuous torque is then exerted on the shaft by an ascending or descending table, to which e.g. sheets of paper are supplied or withdrawn, it can be arranged according to a further embodiment of the present invention that the other end of the wrap spring is connected to a frame portion and the continuous torque is exerted on the cylinder-shaped part in the form of a shaft, which forms the element to be controlled, while the shaft is locked against rotation by the wrap spring when the control member is in its starting position. By using for a control member a sensor resting on the upper sheet, a change in the number of sheets from the stack will imply a change in the position of the sensor, so that the wrap spring is switched and the shaft rotates until the sensor has again returned to its starting position, which means that the top of the changing stack of sheets on the ascending or discending table is maintained at substantially the same level, so that the sheet supply or withdrawal mechanisms can be arranged in a substantially stationary position.

According to a still further embodiment of the present invention, the other end of the wrap spring is connected to the element formed by a part mounted pivotally about the axis and the continuous torque is exerted on that part by pivoting said part out of a starting position, whereafter said part tends to pivot back to that position through gravity, which return momement is prevented by the wrap spring, when the control member in its starting position. In that embodiment, e.g. the position occupied by a relatively heavy pivoting cover can be controlled steplessly in a quick and simple manner by exerting a relatively small force, thereby locking the pivoting cover in any desired pivoting position against unintentional swinging down or further swinging down in a very reliable manner, while the upward pivoting of the cover is not impeded by the wrap spring. As the other end of the wrap spring is coupled with the cover, the wrap spring will perform the same rotation when the cover swings up. As a consequence it is possible to incorporate the control member in the cover and to arrange it movably relatively to the cover for exerting the controlling force. Displacement of the control member will then be undone by switching the wrap spring and pivoting the cover downwards, so that the swinging down of the cover is immediately locked again, unless the displacement of the control member relative to the cover is maintained deliberately.

Besides for locking a rotation, the wrap spring can be used as a control element for energizing a shaft. This can be realized according to a further embodiment of the present invention when the other end of the wrap spring is connected to the cylinder-shaped part forming the element to be controlled, and the continuous torque is exerted on a cylindrical part arranged coaxially with the cylinder-shaped part, said cylindrical part, upon displacement of the control member from its starting position, being coupled with the cylinder-shaped part by means of the wrap spring, whereby the cylinder-shaped part is driven by the continuous torque. When the displacement of the control member is terminated, there will again be produced an uncoupling between the cylinder-shaped part and the cylindrical part due to the further rotation relative to the control member of the other end of the wrap spring, thereby removing the energization of the cylinder-shaped part. By providing a double construction, which is possible according to a still further embodiment of the present invention, because a second wrap spring is used whose windings extend oppositely to those of the first, on one of the ends of which a control force can be exerted by means of displacement of a second control member, and whose other end is likewise connected to the cylinder-shaped part, while the continuous torque is also exerted on a second cylindrical part arranged coaxially with the cylinder-shaped part, in such a manner that said second part is rotated oppositely to the first, both control members being mounted on an actuating shaft, which in a neutral starting position couples neither one nor the other control member to the one or the other cylindrical part, but during the rotation out of said neutral position, depending upon the direction of rotation, through the coupling of either the combination of first cylindrical part, first wrap spring and cylinder-shaped part, or the combination of second cylindrical part, second wrap spring and cylinder-shaped part, the continuous torque rotates the cylinder-shaped part in one direction or the other, the cylinder-shaped part to be energized is drivable in two directions. A similar construction can be used e.g. in a power steering construction for a motor vehicle, wherein the two control members are attached to a rod connected to the driving wheel and the energized, cylinder-shaped part effects the steering of the wheels.

The present invention also relates to a device for controlling the rotation of an element about an axis by means of a wrap spring having at least one winding extending about a cylinder-shaped part, one end of said wrap spring being attached to a movable control member and the other end to one of the other parts of the device, the arrangement being such that through displacement of the control member, the wrap spring can be coupled to, or uncoupled from, the cylinder-shaped part by winding or unwinding, means being provided for exerting a continuous torque which, controlled by displacement of the control member from its starting position, is adapted to rotate the element. The wrap spring can then be used as a controlling element in an energized system with mechanical feedback by providing according to the present invention a movable part having a displacement mechanism which, when actuated by rotation of the element as a result of the control member being brought out of its starting position, returns this again to its starting position.

When an intermittent but directly operative rotation of a shaft is desired, it can be arranged according to a further embodiment of the present invention that the means for exerting a continuous torque engage with the element, the wrap spring coacts with a stationary part of the device for locking a rotation of the element when the control member is in its starting position, and there being provided a part movable by rotation of the element, which part, upon rotation of the element, by bringing the control member out of its starting position, displaces this in such a manner that this returns to its starting position relative to the other end of the wrap spring.

When according to a further embodiment of the present invention, the movable part is a table movable substantially perpendicularly to its plane, and arranged to receive a stack of sheets, and the control member is a sensor in the form of a part movable along with, and relatively to, the table, said part being coupled through a transmission mechanism to one end of the wrap spring, while the other end of the wrap spring is fixedly connected to a frame part, an effectively operating construction is then obtained in a simple manner by means of which the top surface of the stack, in spite of the change in the number of sheets forming the stack, can be maintained at the same level. In the event that sheets are withdrawn from the stack, it is preferred that the table is an ascending table and the cylinder-shaped part in the form of a shaft is subject to a continuous torque in such a manner that a continuous force tending to lift the table acts on said table. When sheets are added to the stack, the top surface of the stack can be maintained at the same level when the table is a descending table and the cylinder-shaped part in the form of a shaft is coupled with the displacement mechanism of said table in such a manner that the descent of the table through gravity rotates the shaft.

When the movable part is a pivoting cover adapted to pivot upwardly from a horizontal starting position around a horizontal shaft and the sensor is a bell-crank lever having a pivot pin mounted in the pivoting cover, one end of the wrap spring extending about the horizontal shaft being movable by one end of the lever, whose other end can be displaced relatively to the cover, and the other end of the wrap spring being fixedly connected to the pivoting cover, there is obtained an effective construction for e.g. a copying apparatus. Cover and control member can then be handled simultaneously in a simple manner when the end of the bell-crank lever to be displaced relatively to the cover is accessible for operation from the surface thereof which is in an upper position as the cover pivots upwardly. Upward pivoting of the cover is not opposed by the wrap spring, while downward pivoting of the cover by gripping it and at the same time displacing the control member relatively to the cover and keeping it in its displaced position, is not prevented by the wrap spring either. However, when the cover and hence the control member are released, the control member is displaced relatively to the cover and switches the wrap spring, which prevents further downward pivoting of the cover.

The wrap spring is operative as an element positively switching the energization when the wrap spring extends partly about the cylinder-shaped part forming the element to be controlled, and partly about a cylindrical part mounted coaxially with the cylinder-shaped part, said cylindrical part being drivable with a continuous torque, with the other end of the wrap spring being connected to the cylinder-shaped part, the arrangement being such that by displacement of the control member, the continuously driven cylindrical part can be coupled to the cylinder-shaped part through the wrap spring, while the resulting rotation of the cylinder-shaped part undoes the coupling again when the control member is not further displaced. Energization in two directions of rotation can then be effected when a second wrap spring having a winding direction opposite to that of a first wrap spring is arranged around the cylinder-shaped part and a second cylindrical part mounted coaxially with the cylinder-shaped part, said second cylindrical part being drivable with a continuous torque opposite to that of the first cylindrical part, the other end of the second wrap spring is also connected to the cylinder-shaped part and a second control member, similarly to the first control member, is adapted to effect a coupling between the cylinder-shaped part and the second cylindrical part, the arrangement being such that either neither of the two control members or either one or the other control member effects a coupling.

A particularly compact construction can then be realized when the two control members are mounted on a rotatably mounted control shaft mounting the cylinder-shaped part forming the element to be controlled, on which cylinder-shaped part, in turn, the two cylindrical parts are mounted, which effect can be further reinforced when the two cylindrical parts have such inclined teeth and are so arranged relatively to each other that they can be brought into rotation by a single drive shaft. In that case, there is obtained a construction which is for instance highly suitable for being used as a power steering in a motor vehicle.

Some embodiments of the method of, and of the device for, controlling the rotation of an element about an axis through a wrap spring according to the present invention will now be described, by way of example, with reference to the accompanying drawings, in which:

FIG. 4 is a highly diagrammatic view of a copying apparatus with upwardly pivoting cover;

FIG. 5 shows the pivoting mechanism for the cover shown in FIG. 4 on an enlarged scale;

FIG. 6 shows a variant of the pivoting mechanism shown in FIG. 5; and

Figure 1:
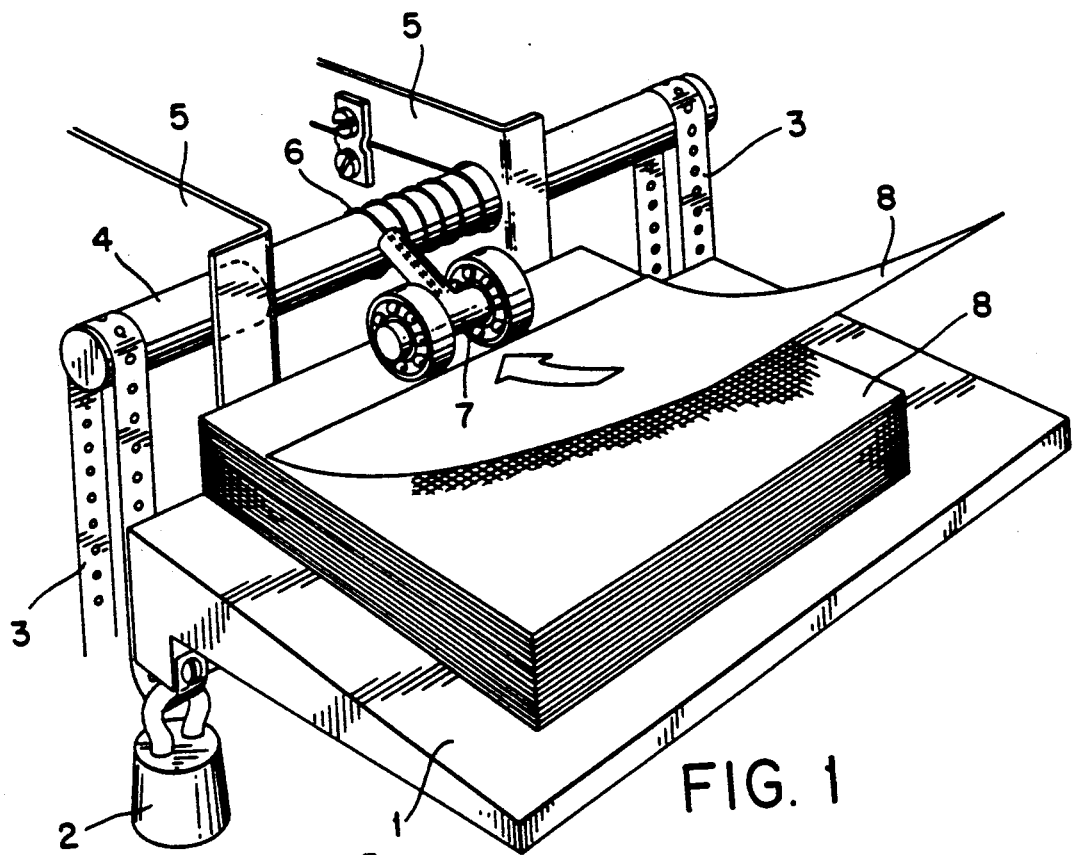
FIG. 1 shows a descending table.

FIG. 1 shows a descending table, a carrier portion 1 of which is conducted in a manner not shown in vertical direction of displacement. On the one hand, the descent of carrier portion 1 results from the weight of that part itself and what lies thereon, and on the other hand from a force exerted positively on portion 1, which force is shown more or less symbolically by a weight 2 suspended slidably in a belt 3 passed over a shaft 4 and coupled therewith through a tenon-and-mortise joint, so that displacement of carrier portion 1 should be concomitant with rotation of shaft 4 mounted in frame portions 5. A wrap spring 6 is wound around shaft 4 and is provided at its one end with a control member 7 in a first position, while the other end of the wrap spring is connected to a frame portion 5. Wrap spring 6 is constructed and mounted in such a manner that, in the position shown in FIG. 1, wrap spring 6 is in intimate contact with shaft 4, thereby locking the same against rotation initiated by the torque produced by carrier portion 1 and weight 2 on shaft 4.

Lying on carrier portion 1 as shown in FIG. 1 is a stack of flat products, such as paper sheets 8. When further sheets 8 are supplied and pushed underneath control member 7, this results in a lifting of said control member 7 from the first position. In the situation shown, a lifting of control member 7 implies an unwinding of wrap spring 6 relatively to shaft 4. After thus supplying a given number of sheets 8, said unwinding will become sufficiently large to reduce the contact between wrap spring 6 and shaft 4 to such an extent that the locking of shaft 4 by wrap spring 6 is removed and shaft 4 starts to rotate under the influence of the continuous torque exerted thereon, so that carrier portion 1 starts its descent. This last displacement also results in the descent of control member 7 back to the first position, so that wrap spring 6 is again wound more tightly about shaft 4, thereby locking the same against further rotation.

In this manner, a larger torque can be actuated or deactuated as regards its activity by means of a slight control force exerted on control member 7. The control can be adjusted in such a manner that the level at which a new sheet 8 is each time received, remains substantially equal, without requiring any further control therefor.

It is observed that during the locking operation of wrap spring 6, the end thereof attached to one of the frame portions 5 may be subjected not only to a tensile but also to a bending load. When this is undesirable in connection with the magnitude of the torque to be locked, the embodiment shown in FIG. 2 can be applied.

Figure 2:
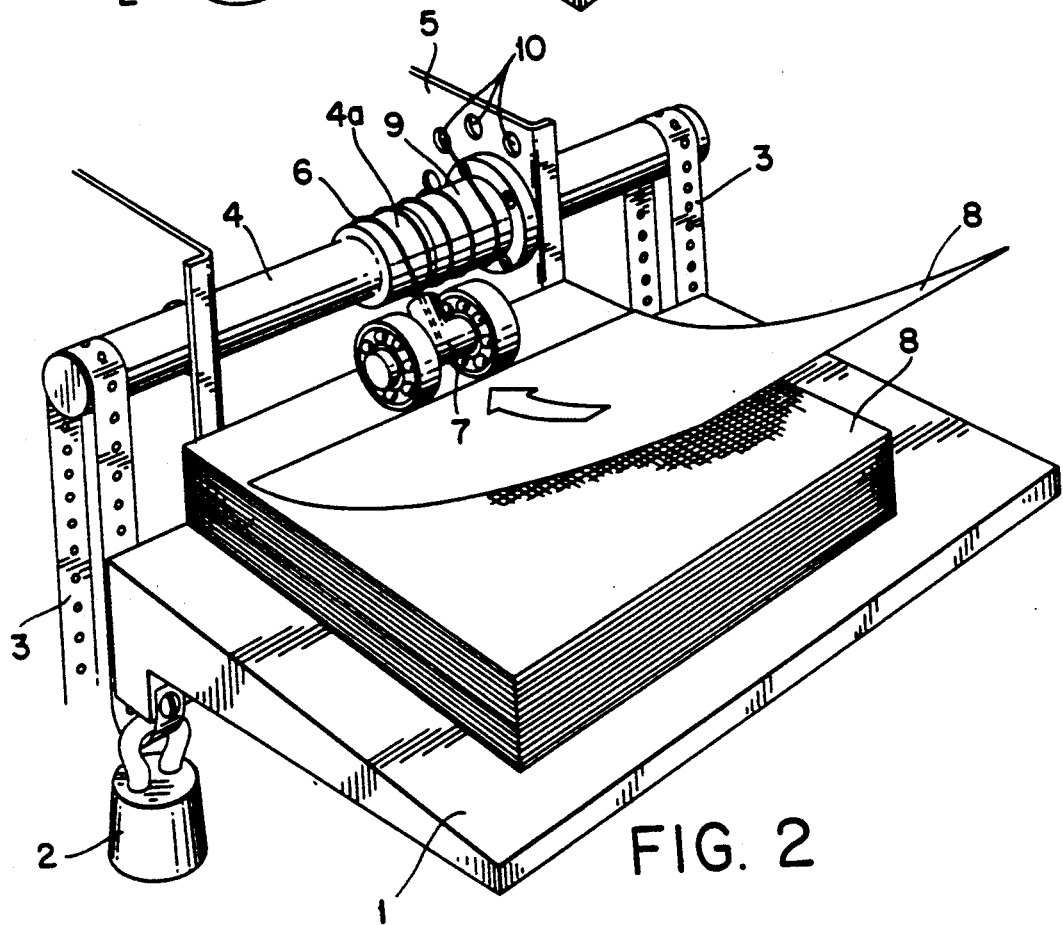
FIG. 2 shows a variant of the descending table according to FIG. 1.

The variant shown in FIG. 2 of the descending table according to FIG. 1 is likewise provided with a carrier portion 1, weights 2, belts 3, a shaft 4, frame portions 5, a wrap spring 6 and a control member 7. Contrary to the construction shown in FIG. 1, however, a number of windings of wrap spring 6 do not contact shaft 4, but are wound about a boss portion 9 affixed to one of the frame portions 5. The other windings of wrap spring 6 make contact with a thickened portion 4a of shaft 3, said portion 4a having the same diameter as boss portion 9.

The operation of this descending table is identical to that according to FIG. 1, be it at now the locking of shaft 4 takes place by the contact between wrap spring 6 and boss portion 9, whereby the end of wrap spring 6 connected to one of the frame portions 5 is relieved from bending forces and the torque to be taken up may thus be substantially greater than in the situation shown in FIG. 1.

It is further observed that in the embodiment shown in FIG. 2, the end of wrap spring 6 to be connected to one of the frame portions engages in one of a plurality of apertures 10 provided in such frame portion. In this manner, an adjustment possibility for wrap spring 6 can be provided.

Figure 3:
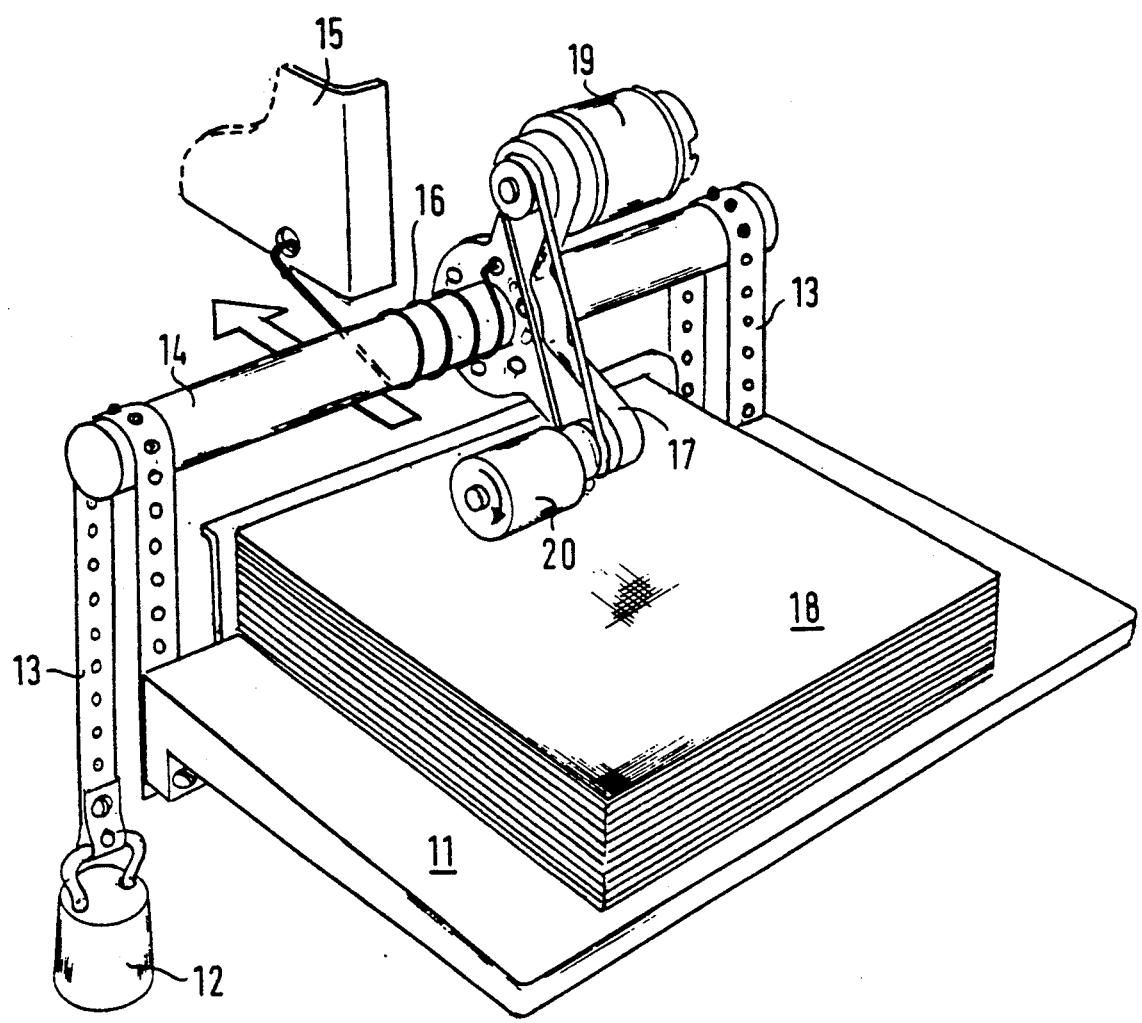
FIG. 3 shows an ascending table.

FIG. 3 shows an ascending table provided with a carrier portion 11, which is movable vertically in guides, not shown, and on which an ascending force is exerted by a weight 12 suspended from a belt 13 wrapped about a shaft 14 and coupled therewith through a tenon-and-mortise joint. Shaft 14 is mounted in a frame, not shown to a portion 15 of which a wrap spring 16 whose one end is coupled with a control member 17 in the first position, is fixedly connected with its other end. Wrap spring 16 is constructed and arranged in such a manner that, in the situation shown in FIG. 3, this prevents rotation of shaft 14 a result of the torque produced by weights 12. Control member 17 rotatable about shaft 14 is provided with a roller 20 drivable through a motor 19.

Lying on carrier portion 11 is a stack of flat products, such as paper sheets 18. By driving roller 20, successively sheets 18 will be discharged, so that the stack of sheets 18 becomes lower, roller 20 descends and control member 17 pivots accordingly from the first position about shaft 14, resulting in an unwinding of wrap spring 16 and hence in release of shaft 14, which is rotated by the torque exerted thereon, thereby lifting carrier portion 11. The ascent of carrier portion 11 causes control member 17 to rotate back to the first position and wrap spring 16 to coil, thereby locking shaft 14 against rotation. The level from which sheets 18 are discharged can thus be kept substantially constant.

FIG. 4 shows highly diagrammatically a copying apparatus 21 having an upwardly pivoting cover 22. It is desirable in such an apparatus that the cover can be pivoted upwards and downwards easily without the risk of a spontaneous downward pivoting motion. To that effect, the cover may be provided with a control mechanism, as shown on an enlarged scale in FIG. 5.

The control mechanism shown in FIG. 5 is fitted with a bearing 23 affixed to the frame of apparatus 21. Through a shaft 24, a pivoting rod 25 is pivotally mounted in bearing 22. Pivoting rod 25 is affixed to cover 22. Bearing 23 and pivoting rod 25 are concentric relative to shaft 24 and provided with adjacent cylindrical portions of equal outside diameter. Wound around said portions is wrap spring 26 whose one end is connected to a control member 27 in the form of a bellcrank lever being pivotal about a shaft 25a attached to pivoting rod 25. The other end of wrap spring 26 is attached to the cylindrical portion of pivoting rod 25 provided for that purpose with a plurality of apertures, so that wrap spring 26 can be coupled adjustably therewith relatively to pivoting rod 25.

Wrap spring 26 is constructed and arranged in such a manner that cover 22, from an upwardly pivoted position, is prevented from being pivoted downwards through gravity. Locking pivoting rod 25 relatively to bearing 23 is then ensured by wrap spring 26. When a downward pivoting motion of cover 22 is desired, pressure should be exerted on end 27a of control member 27, thereby unwinding wrap spring 26 and the weight of the cover causing this to pivot downwards. Pivoting motion of cover 22, however, causes wrap spring 26 to coil again, thus preventing further pivoting motion, unless displacement of control member 27 relative to cover 22 is maintained deliberately, e.g. by seizing the cover and simultaneously exerting a continuous downwards pressure with a finger on control member 27. Inadvertent pressure or impact against end 27a, consequently, causes cover 22 to rotate through a small angle only, which rotation at the same time initiates the locking.

FIG. 6 shows a variant of the control mechanism shown in FIG. 5. Instead of a bearing 23, a shaft 28 is mounted for non-rotation in apparatus 21. A pivoting rod 29 connected to cover 22 is pivotal about shaft 28. A wrap spring 30 prevents again said pivoting motion by intimate contact with shaft 28, which contact can be broken by a control member 31, which as a bell-crank lever, is pivotally connected to pivoting rod 29 through a shaft 32.

The operation of the control mechanism shown in FIG. 6 is similar to that shown in FIG. 5. As, upon locking motion of cover 22 against downward pivoting motion in the embodiment shown in FIG. 6, bending forces may be exerted on the end of wrap spring 30 connected to pivoting rod 29, the construction shown in FIG. 6 is rather destined for less heavy covers than can be used in the embodiment shown in FIG. 5.

Figure 7:
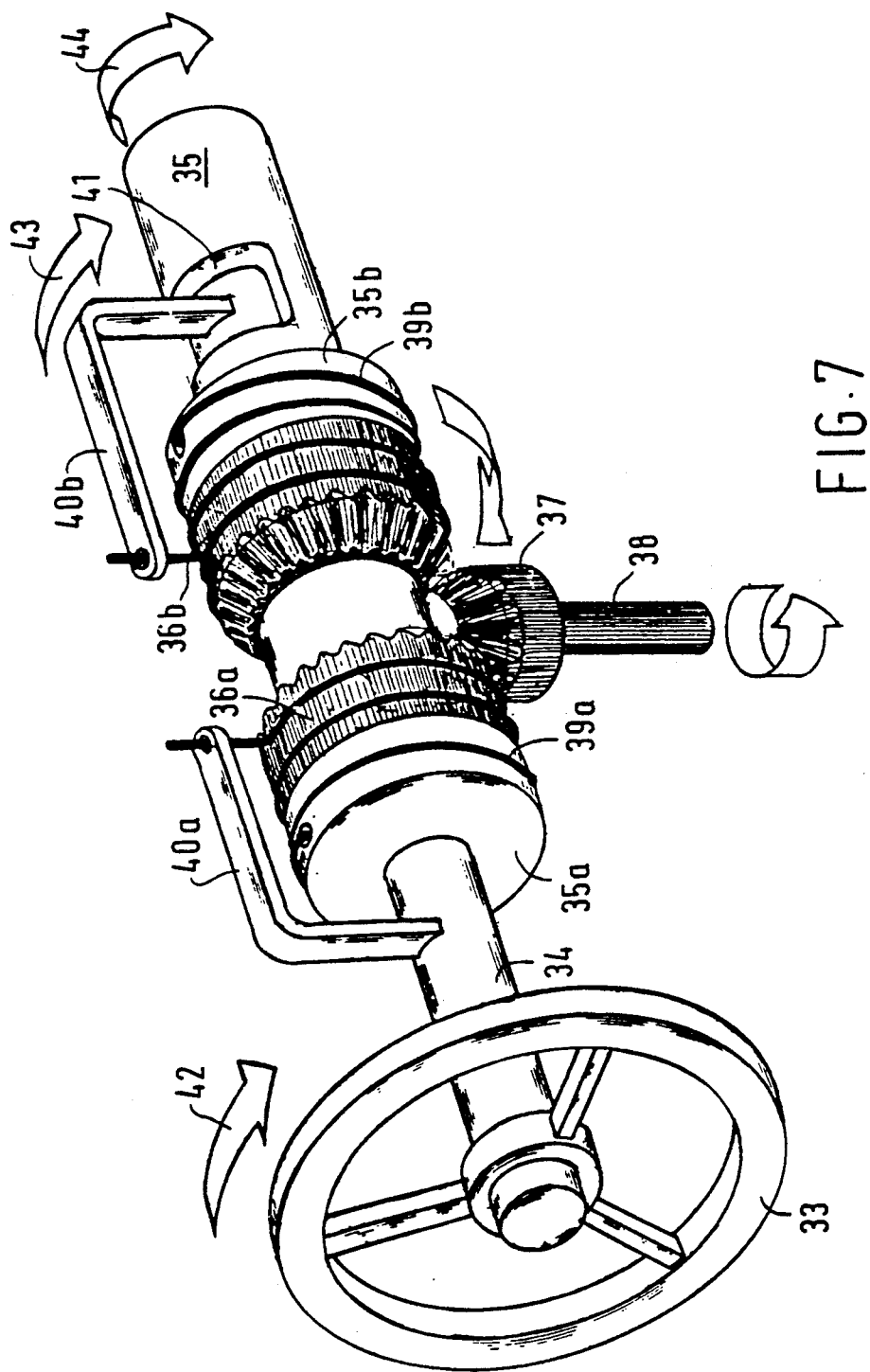
FIG. 7 shows a power steering unit.

FIG. 7 shows a power steering device having a driving wheel 33 on a steering rod 34 and a steering shaft 35 to be energized, arranged concentrically on, and about, steering rod 34. Rotatably mounted on steering shaft 35 are a paper or cylinder-shaped portions 36a, 36b constructed in such a manner, provided with inclined teeth, and arranged so that said two portions are drivable sumultaneously and oppositely by a pinion 37 having inclined teeth at the end of a continuously rotatable motor shaft 38. Coupling of portion 36a or 36b to steering shaft 35 takes place by means of a wrap spring 39a or 39b. Wrap spring 39a is coupled at its one end to a control member 40a affixed to steering rod 34, and attached with its other end to a thickened portion 35a of steering shaft 35. The thickened portion 35a has the same outside diameter as cylinder-shaped portion 36a, so that the windings of the wrap spring extend partly around thickened portion 35a and partly around cylindrical portion 36a. Similarly, wrap spring 39b is connected on the one end to a control member 40b affixed to steering rod 34, and on the other end to a thickened portion 35b of steering shaft 35. For the passage of control member 40b, steering shaft 35 is provided locally with a cut-out 41.

The above arrangement is such that, in a neutral central position, neither wrap spring 39a nor wrap spring 39b effects a coupling between motor shaft 38 and steering shaft 35 through the associated cylindrical portion. The motor shaft then drives cylindrical portions 36a, 36b continuously but these freely rotate about steering shaft 35.

When a rotation of steering shaft 35 is desired, this can be initated by rotation of driving wheel 33, e.g. in the direction of arrow 42 in FIG. 7. This rotation results in the same rotation of steering shaft 34 and hence control members 40a, 40b. Control member 40b causes wrap spring 39b to coil, upon rotation, in arrow direction 43, and control member 40a causes wrap spring 39a to unwind. The coiling of the wrap spring 39b effects a coupling between cylindrical portion 39b and thickened portion 35b, and hence between motor shaft 38 and steering shaft 35, which is thereby rotated in energized state. Rotation of steering shaft 35 with simultaneous stopping of the driving wheel at the end of the desired rotation, causes the end of wrap spring 39b connected to the steering shaft to move in the unwinding direction relatively to the end of wrap spring 39b connected to the control member, so that this removes the coupling between motor shaft 38 and steering shaft 35.

When driving wheel 33 is rotated against the direction of arrow 42, wrap spring 39a will rotate steering shaft 35 oppositely to the direction of arrow 44 by means of the cylindrical portion 36a rotating oppositely to portion 36b.

It is observed that when a torque is exerted on steering shaft 35 in the direction of arrow 44, while driving wheel 33 is kept in unaltered position, this results in a twisting of wrap spring 39a and hence in a coupling with the cylindrical portion 36a being driven in opposite sense. Undesirable or unintentional rotation of steering shaft 35 is thus opposed in energized state.

It is natural that many other variants and modifications of the above discussed embodiments are possible within the scope of the present invention.

I claim:

1. A device for controlling the rotation of an element about an axis, comprising:
   means for exerting a continuous torque on the element; and
   means for selectively precluding rotation of the element, said rotation precluding means including
      a wrap spring wrapped around the element, one end of said wrap spring being anchored
      a control member attached to an other end of said wrap spring such that said wrap spring is wrapped tightly about the element to preclude rotation of the element when said control member is in a first position, and said wrap spring is wrapped loosely about the element so that the element may rotate under said continuous torque when said control member is out of said first position, rotation of the element under said continuous torque causing said control member to return to said first position to thereby preclude further rotation of the element.

2. A device as claimed in claim 1, wherein said one end of said wrap spring is anchored to a stationary part of said device.

3. A device as claimed in claim 1, further including a movable part, rotation of the element under said continuous torque acting to move said movable part such that said control member is returned to said first position by said movable part.

4. A device for controlling the rotation of an element about an axis, comprising:
   means for exerting a continuous torque on the element; and
   means for selectively precluding rotation of the element; said rotation precluding means including
      a wrap spring wrapped around the element, one end of said wrap spring being anchored,
      a control member attached to an other end of said wrap spring such that said wrap spring is wrapped tightly about the element to preclude rotation of the element when said control member is in a first position, and said wrap spring is wrapped loosely about the element so that the element may rotate under said continuous torque when said control member is out of said first position, rotation of the element under said continuous torque causing said control member to return to said first position to thereby preclude further rotation of the element, and
      a movable part, rotation of the element under said continuous torque acting to move said movable part such that said control member is returned to said first position by said movable part, wherein said movable part is a table movable substantially perpendicularly to its plane, and arranged to receive a stack of sheets, and said control member is a sensor part movable along with, and relative to, said table, said sensor part being coupled through a mechanism to said other end of said wrap spring, while said one end of said wrap spring is fixedly connected to a frame part.

5. A device as claimed in claim 4, wherein said table is an ascending table and the element is subjected to said continuous torque in such a manner that a continuous force tending to lift said table acts on said table.

6. A device as claimed in claim 4, wherein said table is a descending table and the element is coupled to a displacement mechanism of said table in such a manner that descent of said table through gravity rotates the element.

7. A method of controlling the rotation of an element about an axis, comprising:
   exerting a continuous torque on the element; and
   selectively precluding rotation of the element, said rotation preclusion step including the steps of
      providing a wrap spring around the element such that one end of said wrap spring is anchored, and
      providing a control member attached to another end of said wrap spring such that said wrap spring is wrapped tightly about the element to preclude rotation of the element when said control member is in a first position, and said wrap spring is wrapped loosely about the element so that the element may rotate under said continuous torque when said control member is out of said first position, wherein rotation of the element causes displacement of a movable part, said displacement of said movable part returning said control member to said first position.

8. A method as claimed in claim 7, wherein said one, anchored end of said wrap spring is attached to a frame portion.

9. A method as claimed in claim 7, wherein said movable part is a table movable substantially perpendicularly to its plane and arranged to receive a stack of sheets, and said control member is a sensor, wherein by changing a number of sheets forming the stack, said sensor is brought out of said first position, and owing to a resulting displacement of said table, due to uncoupling of said wrap spring from the element, said sensor is returned to said first position.

10. A method as claimed in claim 9, wherein the sheets are withdrawn from the stack of sheets lying on said table one by one, and said resulting displacement of said sensor brings about an uncoupling of said wrap spring and the element, the element being coupled to said table in such a manner and being under the influence of such a torque that the reduction of the number of sheets is compensated by a rise of said table, so that said sensor returns to said first position and the element is locked from further rotation by said wrap spring and hence said table is prevented from rising further.

11. A method as claimed in claim 9, wherein sheets are supplied to the stack of sheets lying on said table one by one, and said resulting displacement of said sensor brings about an uncoupling of said wrap spring and the element, the element being coupled to said table in such a manner that, upon uncoupling of said wrap spring, the element is rotated due to a weight of said table and the sheets lying thereon, with simultaneous lowering of said table, so that said sensor is returned to said first position and the shaft is locked from further rotation by said wrap spring and hence said table is prevented from lowering further.

12. A method of controlling the rotation of an element about an axis, comprising the steps of:
   exerting a continuous torque on the element; and
   selectively precluding rotation of the element, said rotation preclusion step including the steps of
      disposing a wrap spring around the element such that one end of said wrap spring is anchored, and disposing a control member attached to another end of said wrap spring such that said wrap spring is wrapped tightly about the element to preclude rotation of the element when said control member is in a first position, and said wrap spring is wrapped loosely about the element so that the element may rotate under said continuous torque when said control member is out of said first position, rotation of the element under said continuous torque causing said control member to return to said first position to thereby preclude further rotation of the element.

13. A method as claimed in claim 12, wherein said one, anchored end of said wrap spring is attached to a frame portion.

* * * * *